Patented Sept. 14, 1937

2,093,096

UNITED STATES PATENT OFFICE 2,093,096

PRODUCTION OF HIGH MOLECULAR HYDROGENATION PRODUCTS OF HIGHLY VISCOUS CHARACTER

Mathias Pier, Heidelberg, Friedrich Christmann, Ludwigshafen-on-the-Rhine, and Ernst Donath, Mannheim, Germany, assignors to Standard-I. G. Company, Linden, N. J., a corporation of Delaware No Drawing. Application August 15, 1933, Serial No. 685,228. In Germany August 23, 1932

12 Claims. (Cl. 260—1)

The present invention relates to the production of high molecular hydrogenation products of highly viscous character, more particularly from rubber and related substances.

The preparation of high molecular hydrogenation products of solid or highly viscous to lubricating oil character from polymerization products of unsaturated hydrocarbons capable of forming polymeric homologous series, which term is meant to include the products obtainable therefrom by isomerization as for example from rubber, polymerization products of olefines, resins which are completely or partially soluble in organic solvents at elevated temperatures and the like, has recently acquired practical importance because these products are useful as lubricating oils or as additions for improving lubricating oils.

Polymeric homologous compounds according to the definition suggested by Staudinger in "Zeitschrift fuer angewandte Chemie", vol. 42, (1929) page 69 are those which are formed by polymerization of the same elementary molecule and which are different from each other only by the degree of polymerization but which for the rest have the same molecular structure.

It is, of course, apparent that in this definition the term "polymerization" is used in its ordinary chemical sense, that is, to define the union of like molecules without splitting out of any groups from the molecules in question. As noted above, the molecules involved herein are hydrocarbons having an unsaturated aliphatic radicle.

We have now found that the said hydrogenation products are obtained in good yields by partially depolymerizing the initial materials in the presence of organic solvents of high boiling point, before the hydrogenation, and then hydrogenating the resulting products at a temperature of at least 100° C. The partial depolymerization may be effected by mechanical treatment, such as rolling or pressing, preferably while heating. The desired depolymerization may also be effected, however, merely by heating. Temperatures ranging between about 50° and 300° C., preferably between 100° and 250° C., come into question for the said heating treatments. The said depolymerization, as a rule, is so conducted that the materials are not converted to any substantial extent into products having a molecular weight of less than 500. Preferably, the depolymerized products still have a mean molecular weight above 1000.

As has been pointed out above, the depolymerization is carried through in the presence of organic solvents of high boiling point, preferably above 150° C. As solvents fractions of high boiling point of tars, mineral oils, or of the products obtained by the distillation or destructive hydrogenation thereof or of the products obtained by the extraction or destructive hydrogenation of coals, for example, may be employed. It is advantageous to employ oils which are saturated as far as possible with hydrogen and which contain no asphalt, as for example gas oils or lubricating oils. The fraction having a mean molecular weight of less than 500 obtained in the subsequent hydrogenation of the said depolymerized substances may also be employed with advantage as the solvent.

Organic solvents may also be employed during the subsequent hydrogenation. For this purpose, use may be made for example of cyclohexane. However, the solvent employed for the depolymerization may also be used in hydrogenation, in which case it is admitted to the hydrogenation vessel, together with the product to be hydrogenated. The solvent, after separation of the hydrogenated product of high molecular weight by distillation, may then be returned in circulation for the dissolution of fresh initial material. When employing a lubricating oil as the solvent, it may be preferable so to regulate the proportions of the mixture that the hydrogenated product, if desired after separation of the middle oil formed, may be directly employed as lubricating oil or as addition agent to lubricating oils. In this manner an improvement in the properties of the lubricating oil used as the solvent may be simultaneously effected in some cases.

The initial material is preferably mixed with the organic solvent for example in the ratio of 1:2 or 1:3 and heated to a temperature above 100° C., preferably between 150° and 200° C. At this temperature the substance to be hydrogenated dissolves completely or partially with simultaneous partial depolymerization. The treatment may be carried out at atmospheric or increased pressure.

The solubility or speed of dissolution of the substances to be hydrogenated in the solvents of high boiling point may be still further increased by the addition of suitable substances, as for example hydrocarbon derivatives containing halogen or oxygen, such as ethylene chloride, perchlorethane, phenol or benzaldehyde. In this manner a highly viscous mass is obtained, which is, however, still capable of flowing and being pumped conveniently, and which may be led for example through a gas-heated tubular preheater and an attached reaction vessel without causing deposits.

The initial materials to be hydrogenated usually have a molecular weight above 50,000. As typical examples may be mentioned polymerization products of unsaturated hydrocarbons capable of forming polymeric homologous series, as for example rubber or polymerization products of diolefines, in particular of butadiene, furthermore cyclo-rubber, polymerization products of olefines, as for example of isobutylene, and also such substances as for example polymerized styrene and natural or artificial resins of the aforesaid kind or similar highly polymerized substances.

The hydrogenation is effected with or without the employment of pressure, as for example at pressures of from 100 to 200 atmospheres or more, and at temperatures of from 100° to 300° C. If hydrogenation products having lubricating oil character are desired, temperatures above 300° C. may even be employed, but as a rule temperatures above 450° C. are not used.

The hydrogenation is preferably carried out in the presence of catalysts capable of promoting the hydrogenation, such as metals, especially those of the 6th to the 8th groups of the periodic system, or their compounds, especially their oxides and sulphides, either as such or in admixture with each other or other substances, such as zinc oxide or aluminium oxide. They are preferably arranged rigidly in the reaction chamber, if desired while employing carriers.

The process according to this invention has the advantage that by reason of the absence of especially high molecular substances, such as are contained for example in raw rubber, a diminution in the activity of the catalyst during the hydrogenation is avoided and the catalysts therefore have a long working life.

The products obtained may be employed as such as lubricating oils having a high viscosity index, flashpoint and specific gravity and low coke test. They may also be added in amounts of from 0.5 to 10 per cent or more to other lubricating oils, the viscosity of the said lubricating oils being thereby considerably improved.

The following example will further illustrate the nature of this invention but the invention is not restricted to this example. The parts are by weight.

*Example*

1 part of raw rubber is introduced while stirring into 2 parts of a petroleum middle oil having a boiling point range of from 200° to 300° C. which is heated to 200° C. The rubber dissolves within a short period of time.

The resulting highly viscous solution is heated to 270° C. under a pressure of 200 atmospheres in a tubular preheater together with hydrogen and then led over a catalyst of nickel and tungsten sulphide which is rigidly arranged in the reaction chamber at the same temperature.

The reaction product, after distilling off the middle oil, has a viscosity of 95° Engler at 100° C., a specific gravity of 0.885 and a coke test according to Conradson of 0.2 per cent. If 4 per cent of this oil be added to a machine oil having a viscosity of 1.95° Engler at 100° C. and a viscosity index of 74, a high quality automobile oil is obtained having a viscosty of 2.3° Engler at 100° C. and a viscosity index of 93. The middle oil recovered by distillation may be employed for dissolving fresh amounts of raw rubber.

Similar results are obtained when employing raw balata or raw guttapercha, instead of raw rubber.

The products obtainable according to the present invention have a molecular weight ranging between about 1000 and 10,000, more particularly between 1000 and 5,000, and a viscosity ranging about between 10° and 500° Engler or even more, usually between 10° and 100° Engler, at 100° C. They contain between 14.5 and 16.5 parts of hydrogen for each 100 parts of carbon. The products are thus fundamentally different from the hydrogenation products obtained directly from the same initial materials, which latter have a molecular weight between 10,000 and 30,000 and a higher viscosity.

What we claim is:—

1. The process of producing a hydrogenation product having a molecular weight between 1000 and 10,000, which comprises partially depolymerizing at an elevated temperature, in an organic solvent boiling above 200° C., a polymerization product derivable from an unsaturated hydrocarbon capable of forming a polymeric homologous series, to produce a product having a molecular weight between about 1000 and about 10,000, and subjecting said resulting product to hydrogenation at a temperature of at least 100° C.

2. The process of producing a hydrogenation product having a molecular weight between 1000 and 10,000, which comprises partially depolymerizing at an elevated temperature, in a hydrocarbon solvent boiling above 200° C., a polymerization product derivable from an unsaturated hydrocarbon capable of forming a polymeric homologous series, to produce a product having a molecular weight between about 1000 and about 10,000, and subjecting said resulting product to hydrogenation at a temperature of at least 100° C.

3. The process of producing a hydrogenation product having a molecular weight between 1000 and 10,000, which comprises partially depolymerizing at an elevated temperature, by mechanical working in an organic solvent boiling above 200° C., a polymerization product derivable from an unsaturated hydrocarbon capable of forming a polymeric homologous series, to produce a product having a molecular weight between about 1000 and about 10,000, and subjecting said resulting product to hydrogenation at a temperature of at least 100° C.

4. The process of producing a hydrogenation product having a molecular weight between 1000 and 10,000, which comprises partially depolymerizing at an elevated temperature, by heating to between about 50° and about 300° C. in an organic solvent boiling above 200° C. a polymerization product derivable from an unsaturated hydrocarbon capable of forming a polymeric homologous series, to produce a product having a molecular weight between about 1000 and about 10,000, and subjecting said resulting product to hydrogenation at a temperature of at least 100° C.

5. The process of producing a hydrogenation product having a molecular weight between 1000 and 10,000, which comprises partially depolymerizing at an elevated temperature, by heating to between about 100° and about 250° C. in an organic solvent boiling above 200° C., a polymerization product derivable from an unsaturated hydrocarbon capable of forming a polymeric homologous series, to produce a product having a molecular weight between about 1000 and about 10,000, and subjecting said resulting product to hydrogenation at a temperature of at least 100° C.

6. The process of producing a hydrogenation product having a molecular weight between 1000 and 10,000, which comprises partially depolymerizing at an elevated temperature, in an organic solvent boiling above 200° C., a polymerization product derivable from an unsaturated hydrocarbon capable of forming a polymeric homologous series, to produce a product having a molecular weight between about 1000 and about 10,000, and subjecting said resulting product to hydrogenation at a temperature between 100° and 450° C.

7. The process of producing a hydrogenation product having a molecular weight between 1000 and 10,000, which comprises partially depolymerizing at an elevated temperature, in an organic solvent boiling above 200° C., a polymerization product derivable from an unsaturated hydrocarbon capable of forming a polymeric homologous series, to produce a product having a molecular weight between about 1000 and about 10,000, and subjecting said resulting product to hydrogenation at a temperature between 100° and 300° C.

8. The process of producing a hydrogenation product having a molecular weight between 1000 and 10,000, which comprises partially depolymerizing at an elevated temperature, in an organic solvent boiling above 200° C., a polymerization product derivable from an unsaturated hydrocarbon capable of forming a polymeric homologous series, to produce a product having a molecular weight between about 1000 and about 10,000, and subjecting said resulting product to hydrogenation at a temperature of at least 100° C. and in the presence of a hydrogenation catalyst.

9. The process of producing a hydrogenation product having a molecular weight between 1000 and 10,000, which comprises partially depolymerizing at an elevated temperature, in an organic solvent boiling above 200° C., a polymerization product derivable from an unsaturated hydrocarbon capable of forming a polymeric homologous series, to produce a product having a molecular weight between about 1000 and about 10,000, and subjecting said resulting product to hydrogenation at a temperature of at least 100° C. and in the presence of an organic solvent.

10. The process of producing a hydrogenation product having a molecular weight between 1000 and 10,000, which comprises partially depolymerizing at an elevated temperature, in an organic solvent boiling above 200° C., a polymerization product derivable from an unsaturated hydrocarbon capable of forming a polymeric homologous series, to produce a product having a molecular weight between about 1000 and about 10,000, and subjecting said resulting product to hydrogenation at a temperature of at least 100° C. and in the presence of the organic solvent used in the depolymerization.

11. The process of producing a hydrogenation product having a molecular weight between 1000 and 10,000, which comprises heating raw rubber in a petroleum middle oil at about 200° C. to produce a product having a molecular weight between about 1000 and about 10,000 and acting with hydrogen on the resulting solution at about 270° C. under a pressure of 200 atmospheres and in the presence of a catalyst of nickel and tungsten sulphide.

12. The process of producing a hydrogenation product having a molecular weight between 1000 and 10,000, which comprises partially depolymerizing at an elevated temperature and in lubricating oil, a polymerization product derivable from an unsaturated hydrocarbon capable of forming a polymeric homologous series, to produce a product having a molecular weight between about 1000 and about 10,000, and subjecting said resulting product to hydrogenation at a temperature of at least 100° C.

MATHIAS PIER.
FRIEDRICH CHRISTMANN.
ERNST DONATH.